Patented Sept. 16, 1941

2,256,274

UNITED STATES PATENT OFFICE 2,256,274

SALICYLIC ACID SULPHONYL SULPHANILAMIDES

Friedrich Boedecker, Dahlem, near Berlin, and Albrecht Heymons, Mariendorf, near Berlin, Germany, assignors to the firm J. D. Riedel-E. de Haen A. G., Britz, near Berlin, Germany No Drawing. Application June 19, 1939, Serial No. 279,996. In Germany June 30, 1938

4 Claims. (Cl. 260—397.7)

It has been found that by introducing the salicylic acid sulphone residue into the amino group of p-aminobenzene-sulphonic acid amide a new compound is obtained having the formula

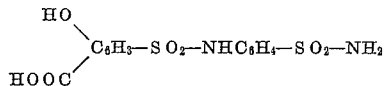

which possesses an outstanding action in the case of rheumatism or lumbago and also is a very valuable urine disinfectant. The action exceeds by far that of the known preparations (acetylsalicylic acid and mixed preparations thereof).

This heretofore unknown substituted amide of sulphonic salicylic acid can be made very simply by the usual methods, e. g. by heating the readily obtainable salicylic acid-5-sulpho-chloride with 4-aminobenzene-sulphonamide, preferably in the presence of substances which bind hydrochloric acid.

Compounds which can be used therapeutically with satisfaction are also obtained by substituting one or both hydrogen atoms of the sulphamine group by alkyl residues, e. g. by the methyl group.

The following examples illustrate the process according to this invention.

*Example 1.*—A mixture of 34.4 parts of p-aminobenzene-sulphonamide and 47.3 parts of salicylic acid sulpho-chloride is treated whilst stirring and cooling with a solution of 27.2 parts of sodium acetate in 24 parts of water, maintained at 25–30° for thirty minutes and then heated for a short time to 65°. After cooling 25% hydrochloric acid (30 parts) is added and the precipitate is filtered off. By dissolution in diluted soda solution and re-precipitation with hydrochloric acid the salicylic-acid-5-sulphone-p-aminobenzene-sulphonic acid amide which is formed is obtained perfectly pure and in approximately quantitative yield. It forms colourless crystals which melt at 247° with frothing up.

*Example 2.*—One mol of salicylic acid sulpho-chloride and 1 mol of aminobenzene-sulphonamide are mixed with 1 mol of anhydrous sodium acetate and the mixture heated up to the commencement of fusion at 105–110°. The melt solidifying again with evolution of acetic acid is maintained for thirty minutes more at this temperature, then dissolved in diluted soda and precipitated with hydrochloric acid. The new acid separates in colourless crystals melting at 247° with frothing up.

*Example 3.*—37.2 parts of p-aminobenzene-sulphonic acid methylamide and 47.3 parts of salicyl sulpho-chloride are interacted, as described in Example 1, in the presence of 27.2 parts of sodium acetate. The salicylic acid-5-sulphone-p-aminobenzene sulphonic acid methylamide separating first of all as an oil becomes solid after a short time and after re-precipitation from soda and hydrochloric acid melts at 205°.

*Example 4.*—Under the same conditions, from 40 parts of p-aminobenzene-sulphonic acid dimethylamide, 47.3 parts of salicylic acid sulpho-chloride and 27.2 parts of sodium acetate, salicylic acid-5-sulphone-p-aminobenzene-sulphonic acid dimethylamide is obtained as an oil soon becoming solid which after re-crystallisation from diluted acetic forms colourless crystals of melting point 203°.

We claim:

1. As a product of manufacture, new salicylic acid sulphonyl sulphanilamides having the formula:

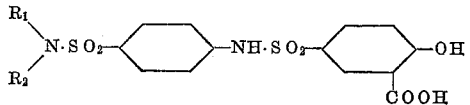

where $R_1$ and $R_2$ are selected from the group consisting of H and lower alkyl radicals.

2. As a product of manufacture, a new salicylic acid sulphonyl sulphanilamide having the formula:

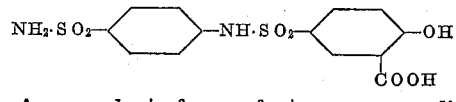

3. As a product of manufacture, a new salicylic acid sulphonyl sulphanilamide having the formula:

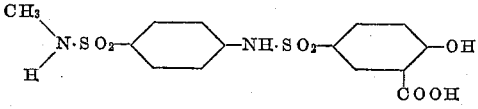

4. As a product of manufacture, a new salicylic acid sulphonyl sulphanilamide having the formula:

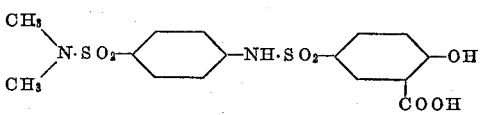

FRIEDRICH BOEDECKER.
ALBRECHT HEYMONS.